United States Patent
Upadhyay et al.

(10) Patent No.: US 10,621,773 B2
(45) Date of Patent: Apr. 14, 2020

(54) RENDERING CONTENT IN A 3D ENVIRONMENT

(71) Applicant: Google LLC, Mountain View, CA (US)

(72) Inventors: Aayush Himanshu Upadhyay, San Francisco, CA (US); Neel Mamidi Rao, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/396,125

(22) Filed: Dec. 30, 2016

(65) Prior Publication Data
US 2018/0190003 A1    Jul. 5, 2018

(51) Int. Cl.
| | |
|---|---|
| *G06T 19/00* | (2011.01) |
| *G06F 3/01* | (2006.01) |
| *G06T 15/00* | (2011.01) |
| *G06F 3/0481* | (2013.01) |

(52) U.S. Cl.
CPC ............ *G06T 15/005* (2013.01); *G06F 3/013* (2013.01); *G06F 3/04815* (2013.01); *G06T 19/003* (2013.01); *G06T 19/006* (2013.01); *G06F 3/016* (2013.01)

(58) Field of Classification Search
CPC ...... G06T 15/005; G06T 19/006; G06F 3/013
See application file for complete search history.

(56) References Cited

U.S. PATENT DOCUMENTS

| | | | |
|---|---|---|---|
| 9,478,109 B2 | 10/2016 | Rihn | |
| 2008/0140722 A1* | 6/2008 | Jakobovits | ............ G06F 19/321 |
| 2010/0169837 A1 | 7/2010 | Hyndman | |

(Continued)

FOREIGN PATENT DOCUMENTS

| | | |
|---|---|---|
| EP | 3040807 | 7/2016 |
| JP | 2013-536534 | 9/2013 |

(Continued)

OTHER PUBLICATIONS

International Search Report and Written Opinion issued in International Application No. PCT/US2017/049321, dated Nov. 9, 2017, 15 pages.

(Continued)

*Primary Examiner* — Tapas Mazumder
(74) *Attorney, Agent, or Firm* — Fish & Richardson P.C.

(57) ABSTRACT

Systems, methods, devices, and other techniques for rendering content in a 3D environment. In some implementations the system includes a memory subsystem, a communications interface, a rendering engine, an input handling apparatus, and a virtual object manager. The memory subsystem is configured to store first data that (i) defines a three-dimensional (3D) environment and (ii) identifies a virtual object in the 3D environment. The communications interface is configured to transmit requests over a network for third-party content to display with the virtual object in the 3D environment and to receive third-party content responsive to the requests. The rendering engine is configured to use the first data from the memory subsystem to render the 3D environment for presentation on a display device, including rendering the virtual object at a specified location of the 3D environment in a first mode in which the virtual object displays a first set of third-party content.

20 Claims, 8 Drawing Sheets

(56) References Cited

U.S. PATENT DOCUMENTS

| | | | |
|---|---|---|---|
| 2013/0083064 A1 | 4/2013 | Geisner et al. | |
| 2013/0263059 A1* | 10/2013 | Amoraga Rodriguez | G06F 3/0484 715/841 |
| 2015/0325026 A1* | 11/2015 | Haase | G06T 13/00 345/473 |
| 2016/0180798 A1* | 6/2016 | Bathiche | G06F 3/013 345/522 |
| 2017/0316387 A1* | 11/2017 | Joshi | G06Q 10/06316 |
| 2017/0351909 A1* | 12/2017 | Kaehler | G06K 9/00288 |

FOREIGN PATENT DOCUMENTS

| | | |
|---|---|---|
| JP | 2013-214944 | 10/2013 |
| JP | 2016-224823 | 12/2016 |
| WO | WO 2009/000028 | 12/2008 |

OTHER PUBLICATIONS

JP Decision to Grant a Patent in Japanese Application No. 2018-549842, dated Jan. 6, 2020, 5 pages (with English translation).

\* cited by examiner

RENDERING CONTENT IN A 3D ENVIRONMENT

BACKGROUND

This specification relates to data processing, including techniques for reducing transmissions of unused third-party content and for efficiently rendering third-party content in a 3D environment.

Various computing systems have been developed that are capable of rendering three-dimensional (3D), virtual environments. By way of example, virtual reality (VR) systems may render a 3D environment that is presented to a user wearing a head-mounted display. The head-mounted display may include an electronic display screen and optical lenses through which the user views the screen and the displayed 3D environment. The system can render the 3D environment stereoscopically on the screen, which creates the illusion of depth to a user when viewed through the lenses of the head-mounted display. Some VR systems provide an immersive user experience so the user feels as if he or she is actually present in the virtual environment. Some VR systems allow a user to look around a 3D environment, move about the 3D environment, and manipulate virtual objects within the 3D environment.

SUMMARY

This document describes systems, methods, devices, and other techniques for reducing transmissions of unused third-party content over a network and for efficiently rendering third-party content in a 3D environment. In general, a client computing system, such as a virtual reality system or an augmented reality system, can present a 3D environment that includes one or more third-party content eligible (3PCE) virtual objects. A 3PCE virtual object is an object (e.g., a 3D object such as a cube, a sphere, a cylinder, or other geometric shape) that is configured to present third-party content (e.g., content provided by an entity different than an entity that provides the 3D environment) at a specified location of the 3D environment. The 3PCE virtual object can be displayed at any given time in one of multiple display modes associated with the object. When a triggering event is detected, such as a user interaction with the 3PCE virtual object, the system may update the virtual object, such as by transitioning the object from one display mode to another. In some implementations, a user's interactions with a 3PCE virtual object causes the object to display a new set of third-party content, to change the type of third-party content displayed by the object, to open a portal to an external resource (also referred to as a "portal resource") associated with displayed third-party content (e.g., a website or an application), or to generate notifications related to displayed third-party content in an external environment outside of the 3D environment.

Some implementations of the subject matter described herein include a computing system. The computing system includes a memory subsystem, a communications interface, a rendering engine, an input handling apparatus, and a virtual object manager. The memory subsystem is configured to store first data that (i) defines a three-dimensional (3D) environment and (ii) identifies a virtual object in the 3D environment. The communications interface is configured to transmit requests over a network for third-party content to display with the virtual object in the 3D environment and to receive third-party content responsive to the requests. The rendering engine is configured to use the first data from the memory subsystem to render the 3D environment for presentation on a display device that is coupled to the computing system, including rendering the virtual object at a specified location of the 3D environment in a first mode in which the virtual object displays a first set of third-party content. The input handling apparatus is configured to detect user interactions with the virtual object in the 3D environment. The virtual object manager is configured to receive an indication from the input handling apparatus of a first user interaction with the virtual object in the 3D environment, and in response, to instruct the rendering engine to transition the virtual object from the first mode in which the virtual object displays the first set of third-party content to a second mode in which the virtual object displays a second set of third-party content.

These and other implementations can optionally include one or more of the following features.

The display can be a head-mounted display. The 3D environment can be a virtual reality (VR) environment that is configured to be viewed using the head-mounted display.

The rendering engine can be configured to render the virtual object in the first mode before the system has obtained the second set of third-party content. The communications interface can be configured to transmit a request for the second set of third-party content based on (i) identifying that a user interaction with the virtual object is about to occur or (ii) identifying that the first user interaction with the virtual object has occurred.

The first set of third-party content can include a collection of images. In the first mode, the virtual object can include a collection of polygonal surfaces that form a 3D geometric shape. The rendering engine can be configured to render the virtual object in the first mode by displaying, on each polygonal surface of the collection of polygonal surfaces, a respective image from the collection of images.

The collection of polygonal surfaces of the virtual object can form a cube when the virtual object is rendered in the first mode.

The rendering engine can be configured, in response to receiving an instruction from the virtual object manager to transition the virtual object from the first mode to the second mode, to animate the cube to reveal the second set of third-party content.

The collection of images can each depict content related to a same topic or entity.

The input handling apparatus can be configured to receive user input to move a user's current viewing location within the 3D environment and to detect a relationship between the user's current viewing location and the location of the virtual object in the 3D environment.

The virtual object manager can be configured to transition the virtual object from the first mode to the second mode based on a determination that the relationship between the user's current viewing location and the location of the virtual object in the 3D environment satisfies one or more criteria.

The relationship between the user's current viewing location and the location of the virtual object can be a distance between the user's current viewing location and the location of the virtual object, wherein the virtual object manager is configured to transition the virtual object from the first mode to the second mode based on a determination that the distance between the user's current viewing location and the location of the virtual object in the 3D environment is less than a threshold distance.

The input handling apparatus can be configured to monitor a direction of a user's gaze in the 3D environment and to detect the first user interaction based on identifying that the user's gaze is in the direction of the virtual object.

The virtual object manager can be configured to transition the virtual object from the first mode to the second mode based on identifying that the user's gaze has been maintained in the direction of the virtual object for a predetermined length of time.

The input handling apparatus can be configured to receive inputs from a hand-based controller and to detect the first user interaction based on a first input received from the hand-based controller while a user's gaze is in the direction of the virtual object in the 3D environment.

The virtual object manager can be further configured, in response to receiving the indication from the input handling apparatus of the first user interaction with the virtual object, to trigger generation of a user notification outside of the 3D environment, the user notification being related to a topic or entity associated with the first set of third-party content.

A type of the second set of third-party content that the virtual object displays in the second mode can be different from a type of the first set of third-party content that the virtual object displays in the first mode.

The type of the first set of third-party content that the virtual object displays in the first mode can be images. The type of the second set of third-party content that the virtual object displays in the second mode can be videos or 3D models.

Some implementations of the subject matter disclosed herein include a method performed by a computing system. The method can include displaying, on a display of a computing system, a three-dimensional (3D) environment; identifying, by the computing system, that a virtual object located in the 3D environment is eligible to present third-party content; obtaining, by the computing system, a first set of third-party content for the virtual object; rendering, by the computing system, the virtual object in the 3D environment in a first mode in which the virtual object presents the first set of third-party content; identifying that a user interaction with the virtual object in the 3D environment meets a predefined set of criteria; and in response to identifying that the user interaction with the virtual object in the 3D environment meets the predefined set of criteria, re-rendering the virtual object in the 3D environment in a second mode in which the virtual object presents a second set of third-party content that is different from the first set of third-party content.

These and other implementations can optionally include one or more of the following features. The first set of third-party content can include a collection of images. Rendering the virtual object in the first mode can include rendering a cube that shows a respective image from the collection of images on each face of the cube, wherein the second set of third-party content includes a video and re-rendering the virtual object in the second mode includes playing the video in the 3D environment.

The system can retrieve the second set of content from a server that is separate from the computing system in response to identifying the user interaction, or another user interaction, with the virtual object in the 3D environment.

Some implementations of the subject matter disclosed herein include one or more non-transitory computer-readable media having instructions stored thereon that, when executed by one or more processors, cause the one or more processors to perform any of the methods disclosed herein.

Some implementations of the subject matter described herein may, in certain instances, realize one or more of the following advantages. First, a computing system may more efficiently render virtual objects that contain third-party content in a 3D environment by constraining the type and/or format of content that is eligible for display on the object when it is initially rendered (e.g., before a triggering event occurs that would transition the object to a different display state). For example, in some implementations, the system may only display images on an object that do not exceed a maximum size constraint before a user has interacted with the object to express interest in the displayed images. Oversized images or other types of media formats (e.g., audio, video) may be prohibited from a primary set of content displayed on the object in the object's initial display mode. Such constraints can help the object to be more efficiently rendered in the 3D environment by reducing the computational demand required to render the object. Additionally, the file sizes of eligible third-party content may be reduced as a result of the type and/or formatting constraints, which speeds delivery of the third-party content from a remote server of a content distribution system.

Second, the computational demand on a client system that renders a 3D environment can be reduced by delaying presentation of certain formats or types of third-party content until a triggering event has occurred. For example, a user may desire to see a complex 3D model of an item while exploring a 3D environment, but the 3D model may be computationally expensive to render in the 3D environment. To avoid draining computing resources in displaying the complex 3D model immediately, the 3D model may only be displayed after a user has first interacted with a virtual object having images in a first mode, which previews the 3D model for the user using a lighter footprint model (e.g., displaying images on a cube or other object with relatively few polygons).

Third, transmissions of unused third-party content can be avoided or reduced by deferring requests for third-party content associated with secondary display modes of a virtual object until a triggering event (e.g., a user interaction with the virtual object or an anticipated user interaction with the virtual object) is detected to have occurred. For instance, if a virtual object is configured to present a video after a user interacts with the object, the video may not be immediately transmitted from the servers of a content distribution system to the client system. Instead, the video may be transmitted in some implementations only after a user has interacted with the object in the 3D environment.

Fourth, distractions to a user's experience in a 3D environment may be reduced by consolidating multiple pieces of third-party content for display on a virtual object and by generating external notifications to a user outside of the 3D environment. For instance, the techniques for presenting third-party content using virtual objects as discussed herein may reduce disruptions to an immersive VR experience.

DETAILED DESCRIPTION

Figure 1:
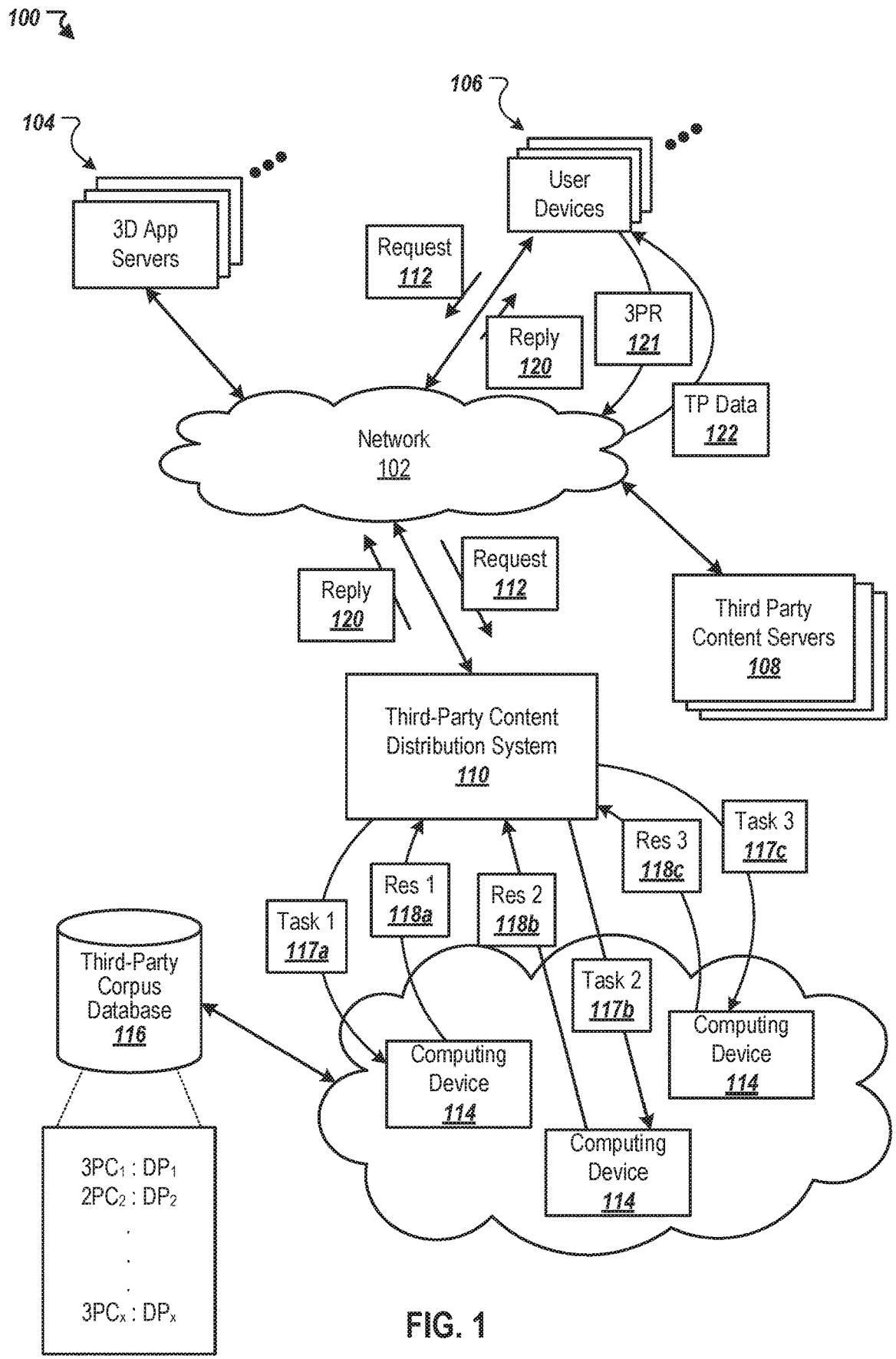
FIG. 1 is a block diagram of an example frame in which third-party content is distributed for presentation with virtual objects in a 3D environment.

FIG. 1 is a block diagram of an example framework 100 in which third-party content is distributed for presentation with virtual objects in a 3D environment, such as a virtual reality environment. The example framework 100 includes a network 102, such as a local area network (LAN), a wide area network (WAN), the Internet, or a combination thereof. The network 102 connects 3D application servers 104, user devices 106, third-party content servers 108, and a third-party content distribution system 110 (also referred to as a content distribution system). The example framework 100 may include many different 3D application servers 104, user devices 106, and third-party content servers 108.

A user device 106 is an electronic device that is capable of requesting and receiving resources (e.g., 3D applications) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

A 3D resource (e.g., a 3D application or a definition file for a 3D environment) is a resource that is directed to rendering 3D environments on a user device 106. Examples of 3D resources include virtual reality applications, video games, mixed reality applications, augmented reality applications, and definitions for 3D environments that can be displayed in any of these types of applications. A 3D resource may include data that defines one or more 3D environments and virtual objects within the 3D environments. 3D resources can be provided to user devices 106 by 3D application servers 104. For example, the 3D application servers 104 can include servers that host publisher websites. In this example, the user device 106 can initiate a request for a given 3D resource, and the 3D application server 104 that hosts the given 3D resource can respond to the request by transmitting the 3D resource to the user device 106. In some implementations, the 3D application server can provide one or more definition files to the user device 106. A definition file includes data that represents a 3D environment that can be processed by a 3D application installed on the user device 106 to render the 3D environment.

In some situations, a given 3D resource can include a third-party tag or third-party script that references the third-party content distribution system 110. In these situations, the third-party tag or third-party script is executed by the user device 106 when the given 3D resource is processed by the user device 106. Execution of the third-party tag or third-party script configures the user device 106 to generate a request for third-party content 112, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The request 112 can include data specifying the 3D resource, data specifying characteristics of the virtual object on which third-party content is to be presented, and data specifying characteristics of the 3D environment in which the virtual object occurs. For example, data specifying a shape or geometry of the virtual object on which the third-party content will be presented, a size of the virtual object (e.g., a length, width, height, and/or volume), a location of the virtual object in the 3D environment, a number of eligible surfaces on the virtual object that can receive third-party content, descriptive keywords associated with the 3D environment, and/or media types that are eligible for presentation on the virtual object can be provided to the content distribution system 110.

Requests 112 can also include data related to other information, such as information that the user has provided, geographic information indicating a state or region from which the request was submitted, or other information that provides context for the environment in which the third-party content will be displayed. Data specifying characteristics of the user device 106 can also be provided in the request 112, such as information that identifies a model of the user device 106, selection capabilities of the device 106 (e.g., whether hand-based controls are available to select virtual objects, whether a control is available on the headset itself that a user can tap to select items rendered in a 3D environment), a configuration of the user device 106, a type of an electronic display (e.g., a touchscreen or a head-mounted display for a VR device 106). Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 selects third-party content that will be presented on or near a virtual object in a 3D environment in response to receiving the request 112 and/or using information included in the request 112.

In some implementations, the third-party content distribution system 110 is implemented in a distributed computing system that includes, for example, a server and a set of multiple computing devices 114 that are interconnected and identify and distribute third-party content in response to requests 112. The set of multiple computing devices 114 operate together to identify a set of third-party content that are eligible to be presented with a 3PCE virtual object from among a corpus of millions of available third-party content ($3PC_{1-x}$), for example. The millions of available third-party content items can be indexed, for example, in a third-party corpus database 116. Each third-party content index entry can reference the corresponding third-party content and/or include distribution parameters ($DP_1$-$DP_x$) (e.g. selection criteria) that condition the distribution of the corresponding third-party content.

In some implementations, the distribution parameters (e.g., selection criteria) for a particular third-party content can include distribution keywords that must be matched (e.g., by 3D resources or terms specified in the request 112) in order for the third-party content to be eligible for presentation. The distribution parameters can also require that the request 112 include information specifying a particular geographic region (e.g., country or state) and/or information specifying that the request 112 originated at a particular type of user device 106 in order for the third-party content to be eligible for presentation. The distribution parameters can also specify a bid and/or budget for distributing the particular third-party content.

The identification of the eligible third-party content can be segmented into multiple tasks 117a-117c that are then assigned among computing devices within the set of multiple computing devices 114. For example, different computing devices in the set 114 can each analyze a different portion of the third-party corpus database 116 to identify various third-party content having distribution parameters that match information included in the request 112. In some implementations, each given computing device in the set 114 can analyze a different data dimension (or set of dimensions) and pass results (Res 1-Res 3) 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more instances of third-party content that will be provided in response to the request 112. For example, the third-party content distribution system 110 can select a set of winning third-party content based on the outcome of one or more content evaluation processes, as discussed in further detail below. In turn, the third-party content distribution system 110 can generate and transmit, over the network 102, reply data 120 (e.g., digital data representing a reply) that enable the user device 106 to integrate the set of winning third-party content into the 3D environment, e.g., for presentation on an eligible virtual object in the 3D environment.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request (3PR) 121 to the third-party content server 108 to obtain a given winning third-party content from the third-party content server 108. In response to the request, the third-party content server 108 will transmit, to the user device 106, third-party data (TP Data) 122 that causes the given winning third-party content to be incorporated into the 3D environment and presented at the user device 106.

FIGS. 2A-2D depict illustrations of an example third-party content eligible (3PCE) virtual object 202 in a 3D environment. In general, a 3PCE object is a virtual object arranged to present third-party content in a 3D environment. The content presented on a 3PCE object may be created and made available for distribution by one or more third-party entities (e.g., individuals, businesses, organizations) that are different and independent from one or more entities that developed the 3D environment in which the third-party content is presented. For example, a virtual reality game may include 3PCE virtual objects to present third-party content (e.g., advertisements) that were generated independently of the game itself and its 3D environment.

A 3PCE virtual object can have multiple display modes when rendered in a 3D environment. For each display mode, the virtual object may present a different set of third-party content, may adopt a different 3D model that defines a shape of the virtual object, may trigger different events within and outside of the 3D environment (e.g., external notifications), or a combination of these. In some implementations, different display modes provide different types or formats of third-party content to display on the virtual object (or otherwise in connection with the virtual object). For example, in a first display mode, a set of third-party images may be displayed on the surfaces of a 3D model that defines a shape of the virtual object. In contrast, a second display mode may provide text, video, or content in another media format to be presented with the virtual object. A user may interact with a 3PCE virtual object, for example, by selecting the object, gazing at the object, approaching the object, or a combination of these. In some implementations, a detected user interaction with a 3PCE object triggers the object to change display modes by transitioning from one active display mode to another active display mode. Thus, if a user has interest in third-party content presented on a virtual object in a first display mode, the user may select the object to view additional or different content related to the same topic of the initially presented third-party content. In some implementations, the system defers obtaining or presenting the additional content until a user indicates his or her interest in the content by interacting with the virtual object, thereby reducing transmissions of third-party content from a content distribution system that would not be rendered in the 3D environment.

Figure 2A:
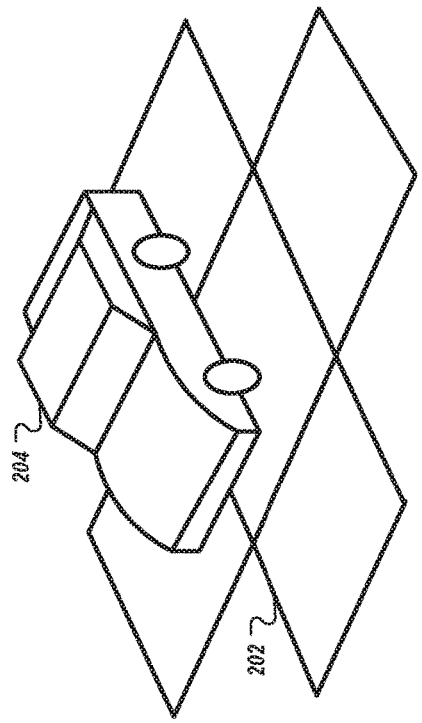
FIGS. 2A-2D depict illustrations of an example third-party content eligible (3PCE) virtual object in a 3D environment.

Turning to FIG. 2A, the 3PCE virtual object 202 is shown in a first display mode. Here, the object 202 has a cubic geometry based on a 3D model in the shape of a cube. In some implementations, the shape of the virtual object 202 complies with a third-party content distribution standard to ensure the virtual object 202 can properly display a set of third-party content that is also formatted in accordance with the distribution standard. For instance, the resolution and file types of third-party media content may be specified by the distribution standard, and the virtual object may be shaped so as to properly display third-party media content on its surfaces. As FIG. 2A shows, in the first display mode, the virtual object 202 shows a respective image (e.g., 202a-c) on each face of the cube. The collection of images presented on the cube in the first display mode constitute a primary set of third-party content, which is the set of third-party content initially displayed on the object 202 when a 3D environment is first rendered. In some implementations, the virtual object 202 slowly rotates in the 3D environment to allow the user to view all sides of the object and the content presented on each side of the object.

Figure 2B:
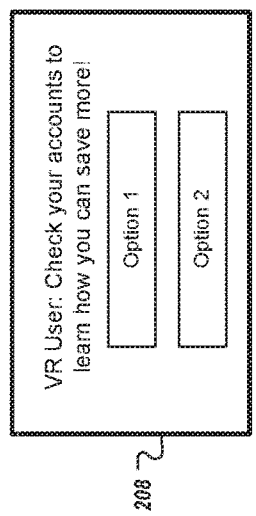
Figure 2D:
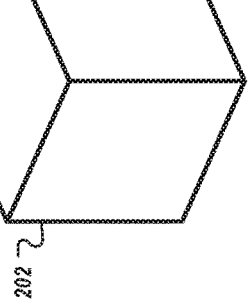
Figure 2C:
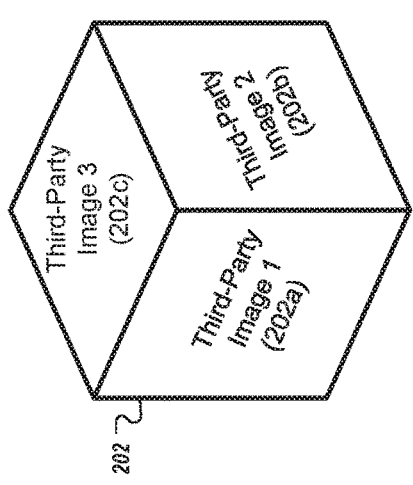

When a user interacts with the virtual object 202 in the 3D environment, the virtual object 202 may transition from the first display mode to another display mode associated with the object 202. FIGS. 2B-2D show example representations of alternative display modes to which the virtual object 202 may transition in response to a detected user interaction with the object 202. Each of the display modes in 2B-2D may be defined by a respective transition-state model that indicates how the object 202 is to display third-party content in the display mode and any supplemental operations associated with the display mode (e.g., generating notifications outside of the 3D environment). For example, when virtual object 202 transitions to a second display mode, as represented in FIG. 2B, the cube model is animated so as to open the cube and reveal a second 3D model 204. The second 3D model 204 may be topically related to the primary set of third-party content that had been displayed on the sides of the cube. For instance, if the images on the side of the cube showed a sports car, the second 3D model 204 revealed inside the cube may be a 3D model of the same sports car.

As another example, FIG. 2C shows a third display mode of the virtual object 202 in which a video player 206 is revealed inside the cube when the cube opens in response to a user's interaction with the object 202. The video player 206 may present secondary third-party content in the form of a video. The video may be selected based on a topical relationship between the content of the video and the primary content that was displayed on the faces of the cube in the first display mode.

As another example, FIG. 2D shows a fourth display mode of the virtual object 202. In the fourth mode, a client system on which the 3D environment is rendered, a content distribution system, or both, generate notifications related to third-party content outside of the 3D environment. When a user interacts with the object 202 in the first display mode, a notification message may be automatically transmitted to one or more accounts of the user. The notification message may include, for example, additional information about a product or service shown in the primary set of third-party content or about the third-party content provider that provided the primary set of third-party content. The notification message may sometimes include a link to an external resource (e.g. a website or an application) associated with the primary set of third-party content or associated with the third-party content provider. Developers, distributors, content providers, and end users may sometimes prefer external notifications to third-party content presented directly in a 3D environment so as to minimize distractions from native content presented in the 3D environment. In some implementations, a pop-up notification message 208 can also be displayed within the 3D environment on or near the virtual object 202. The pop-up notification message 208 may contain the same message sent in the external notification, may contain a confirmation that the external notification has been sent, or both.

Figure 3:
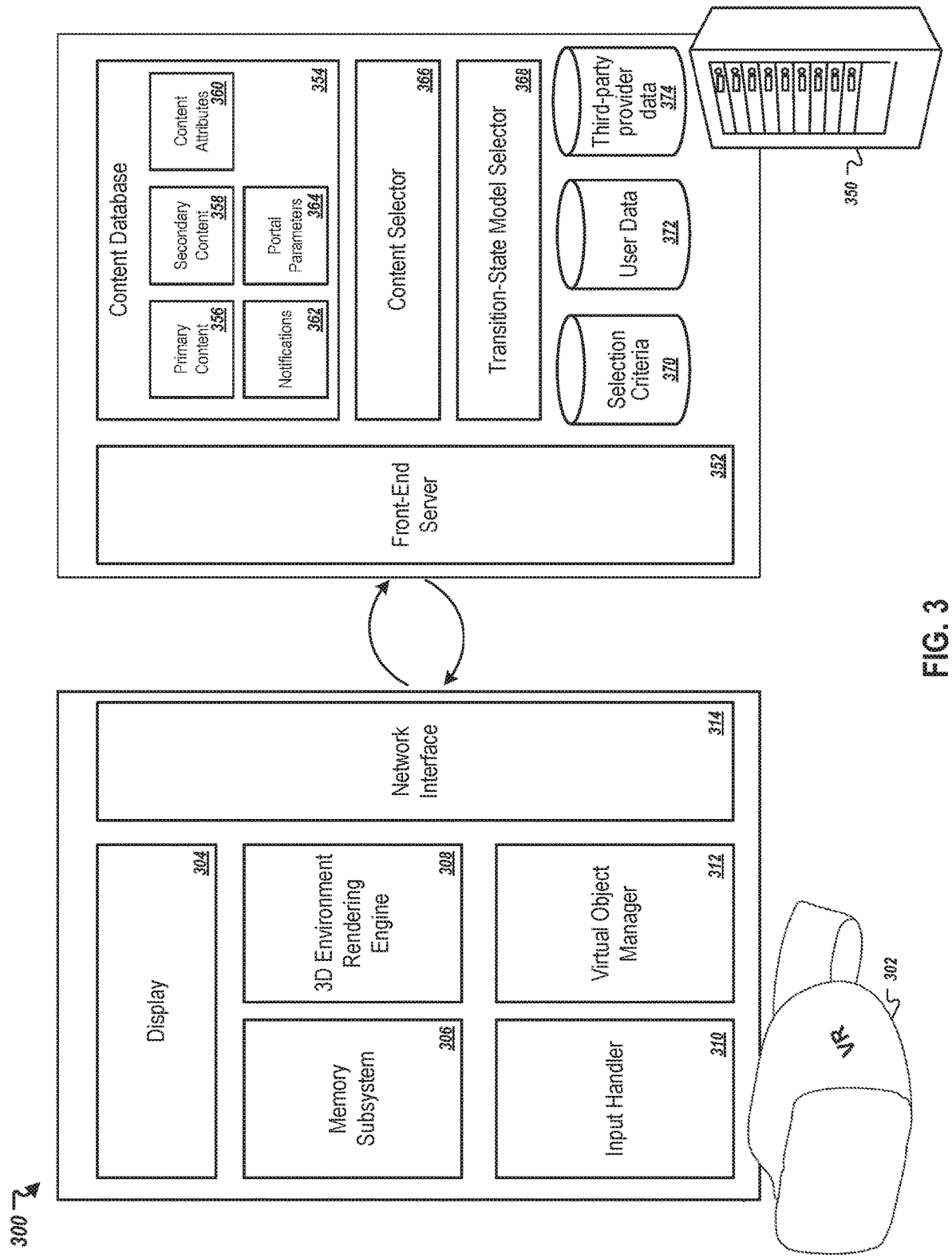
FIG. 3 depicts a block diagram of an example client computing system configured to render a 3D environment showing third-party content specified by a content distribution system.

FIG. 3 depicts a block diagram of an example client computing system 300 that is configured to render a 3D environment showing third-party content specified by content distribution system 350. In some implementations, the client computing system 300 is a user device, e.g., user device 106 from FIG. 1. The content distribution system 350 can be configured as third-party content distribution system 110 from FIG. 1, third-party content servers 108 from FIG. 1, or can include aspects of both systems 108 and 110. The content distribution system 350 can generally be implemented as a system of one or more computers in one or more locations. The client computing system 300 communicates with the content distribution system 350 over a network (e.g., the Internet, a local area network, a wireless broadband network). Although not shown in FIG. 3, the client computing system 300 can communicate with other systems in addition to content distribution system 350 for various purposes. For example, the client computing system 300 may communicate with servers for an online application store or developer servers to obtain virtual reality, augmented reality, and/or mixed reality applications that enable the system 300 to render a 3D environment. Likewise, the client computing system 300 may communicate the servers for an online application store or developer servers to obtain definition files for a 3D environment, e.g., an immersive virtual reality game.

The client computing system 300 can be any of a variety of computing systems that are configured and enabled to render 3D environments with incorporated third-party content. In some examples, the client computing system is configured to present a virtual reality type of 3D environment, which a user views via a head-mounted display. In other examples, the client computing system 300 is configured to present other types of 3D environments, such as an augmented reality environment, a mixed reality environment, or a gaming environment on a conventional two-dimensional screen. The system 300 may be integrated into one device or may include multiple, separately connected components in one or more locations. In some implementations, the client computing system 300 includes a display 304, a memory subsystem 306, a 3D environment rendering engine 308, an input handler 310, a virtual object manager 312, and a network interface 314.

The display 304 is an electronic display that is configured to visually display the 3D environment to a user. The display 304 can take various forms for different types of systems. For example, in a virtual reality system, the display 304 may be a head-mounted display in which the viewing screen of the display 304 is fixed in a position several inches in front of a user's eyes. In a VR system, the display 304 may provide a stereoscopic presentation of a 3D environment. When the user views the stereo presentation of the 3D environment through a set of lenses, the 3D environment can appear to have depth so the user feels as if he or she is immersed in the 3D environment. In some implementations, the screen is an integral component of the head-mounted display. In other implementations, a smartphone or other mobile unit is removably fixed to a head unit to form a head-mounted display that uses the screen of the mobile unit as the screen of the head-mounted display. The display 304 may be, for example, a liquid-crystal display (LCD), an organic light-emitting diode display (OLED), or an active matrix OLED (AMOLED) display.

The memory subsystem 306 includes one or more storage devices storing data that characterizes a 3D environment. A 3D environment is a virtual environment that is capable of being rendered in three dimensions. Examples of 3D environments include 3D gaming and video environments (e.g., live or recorded event streams such as 3D concert or athletic event streams). In some cases, a user of the client computing system 302 can explore a virtual 3D environment by moving his or her head to look around the environment (e.g., in a virtual reality system), by moving around the environment, by manipulating objects in the environment, or a combination of these. Other components of the client computing system 302 may access the memory subsystem 306 to read, write, or delete data from the storage devices.

In some implementations, the data stored by the memory subsystem 306 that characterizes the 3D environment includes declarations for one or more third-party content eligible (3PCE) virtual objects. 3PCE virtual objects can be declared for a 3D environment using any of a variety of suitable programming techniques. In some implementations, developers can insert a tag, a script, or executable code to the definition file(s) for a 3D environment that, when executed, instantiates a 3PCE virtual object in the 3D environment in accordance with any parameters specified therein. For example, the inserted tag, script, or executable code, when processed by the client computing system 302, may cause the client computing system 302 to access a particular 3D model (e.g., a cube or a sphere), to request third-party content from the content distribution system 350, and to render the 3D model with third-party content returned from the content distribution system 350 (or returned from one or more other third-party content servers identified by the content distribution system 350). Developers can manually insert the tag, script, or executable code into the definition (e.g., source code or executable code) for a 3D environment, or the code may be inserted automatically by a programming or design environment used by developers to create 3D environments (e.g., a What You See Is What You Get (WYSIWYG) development environment).

In some implementations, the tag, script, or executable code declaring a 3PCE virtual object can include one or more parameters that specify one or more attributes of the object. The attributes of a 3PCE virtual object may dictate, for example, how the object is displayed in the 3D environment, where the object is located in the 3D environment, the eligible types or geometries of the object, constraints on third-party content that can be selected for display on the object, the interaction model associated with the object, the transition-state model associated with the object, or a combination of two or more of these. In some implementations, 3PCE virtual objects can be highly customizable with many developer-specifiable attributes. In other implementations, 3PCE virtual objects can be declared with relatively few developer-specified attributes, and optionally, developers may be provided with fewer customization options. For example, a developer may declare a 3PCE virtual object by a tag, script, or executable code that simply specifies the location that the object is to be placed in the virtual environment, and in some instances, that further specifies a size of the object (e.g., a length, width, height, and/or volume of the object). Characteristics of a virtual object that are not specified in the object's declaration can be automatically selected by the client computing system 302, the content distribution system 350, or both, based on default settings or based on context associated with the object. The context associated with a 3PCE virtual object can include, for example, characteristics of the 3D environment in which the object is placed, characteristics of the client computing system 302, characteristics of the user or an account of the user viewing the 3D environment, characteristics or preferences of the developer of the 3D environment, or a combination of two or more of these contexts.

The 3D environment rendering engine 308 is a subsystem of the client computing system 302 that is configured to read the definition of a 3D environment from the memory subsystem 306 and to render the 3D environment for presentation to a user via the display 304 and, optionally, using one or more additional peripheral output devices (e.g., speakers, hand-controllers, haptic feedback devices). The rendering engine 308 can include one or more data processing apparatuses (e.g., processors) that are configured and enabled to perform the operations described herein. The data processing apparatuses may be dedicated to the rendering engine 308 or may be at least partially shared with other components of the client computing system 302. In some implementations, the rendering engine 308 includes one or more graphics processing units (GPUs) that process the 3D environment definition files and render a 3D presentation of the environment. For example, the rendering engine 308 for a virtual reality system may process one or more definition files for a 3D environment to generate a stereoscopic display of the 3D environment which, when viewed by a user through specially configured lenses, provides an immersive 3D experience to the user.

The input handler 310 is a subsystem of the client computing system 302 that is configured to monitor one or more input channels for user inputs received while 3D environment is rendered for a user. The input handler 310 can include one or more data processing apparatuses (e.g., processors) that are configured and enabled to perform the operations described herein. The input handler 310 may detect various types of user inputs depending on the particular configuration of the client computing system 302. For example, a basic virtual reality (VR) system may detect user inputs based on signals from one or more orientation and motion sensors in a head-mounted display unit. The orientation and motion sensors may include one or more accelerometers, compasses, gyroscopes, magnetometers, or a combination of such sensors. The orientation and motion sensors can generate signals indicative of the direction of a user's gaze within the 3D VR environment in real time, and these signals can be interpreted by the input handler 310 to track the direction of the user's gaze in real time. Additionally, the client computing system 302 may include one or more buttons or switches, e.g., on a hand-based controller or on the head-mounted display, that can be actuated by a user to provide input to the system 302. More advanced VR systems may provide additional user input channels such as motion tracking sensors located external to the head-mounted display which track movements of fiducials on the head-mounted display. The input handler 310 can interpret signals from the external motion sensors to determine the user's motion in six degrees of freedom, e.g., including rotations and translations.

In some implementations, the input handler 310 includes logic for detecting predefined user actions within a 3D environment. The predefined user actions can include interactions with a 3PCE virtual object in the 3D environment or actions that indicate a user likely is about to interact with a 3PCE virtual object. For example, the rendering engine 308 can draw a reticle in the display of a 3D environment that identifies the direction of the user's gaze. The reticle may be small so as not to clutter the display of the 3D environment or distract from an immersive experience in a VR system, but the reticle may provide helpful feedback for a user to visually identify objects targeted in the 3D environment based on a direction of the user's gaze. The input handler 310 may use the reticle in some implementations to detect a user's interaction with a 3PCE virtual object. For example, if the input handler 310 detects that the reticle has been held in position over a virtual object in the 3D environment for a predetermined length of time (e.g., a pre-specified threshold time interval), then the input handler 310 may register the occurrence of a user interaction with the virtual object and push a notification of the user interaction with the object to the virtual object manager 312. In some implementations, the input handler 310 detects a user interaction with a virtual object based on identifying that the reticle is positioned over the virtual object when an input button or switch is activated. In some implementations, the input handler 310 detects a user interaction with a virtual object based on identifying that the user's gaze is directed toward the object, e.g., by identifying that the reticle is positioned over the virtual object when the user's current viewing location in the 3D environment is within a threshold distance of the location of the object in the 3D environment. The rendering engine 308 may also draw a progress bar over the 3PCE virtual object, near the object, or otherwise in the 3D environment that indicates how much time the user has to gaze at the object to trigger an action, e.g., how long until the object transitions display modes.

In some implementations, the system 302 may monitor for patterns of user input that indicate the user likely is about to interact with a 3PCE virtual object. The input handler 310 may store rules or other logic representing predefined user actions (e.g., patterns of user input) that indicate the user likely is about to interact with a 3PCE virtual object. When the input handler 310 detects that a pattern of use input that matches one of the predefined patterns of user input, the input handler 310 may throw a flag and push a notification to the virtual object manager 312 that indicates the user likely is about to interact with the object. For example, as discussed further below with respect to the virtual object manager 314, when the system throws a flag indicating likely user interaction with a virtual object, the flag may trigger retrieval of secondary third-party content to display with the object in a secondary mode of the virtual object. As such, the secondary content can be retrieved before the user's actual interaction with the object, but the secondary content is deferred until the user's action indicate an intent to actually interact with the object to reveal the secondary content. Network transmissions and local storage requirements for the secondary content can thus be reduced by deferring transmission of secondary content until the input handler 310 detects that the use has interacted with a virtual object or is likely to interact with the virtual object.

The virtual object manager 312 is a subsystem of the client computing system 302 that manages 3PCE virtual objects that appear in a 3D environment. The virtual object manager 312 may be implemented as one or more data processing apparatus (e.g., processors) in one or more locations that are programmed to perform the operations described herein. The data processing apparatus may be dedicated to the virtual object manager 312 or may be shared among the virtual object manager 312 and one or more other components of the client computing system 302.

In some implementations, when a 3D environment is initially loaded and rendered on the system 302, the rendering engine 308 parses the definition file(s) for the 3D environment, identifies any 3PCE virtual objects that are declared to appear in the 3D environment, and calls the virtual object manager 312 to instantiate each 3PCE virtual object. In calling the virtual object manager 312, the rendering engine 308 can pass the values of any parameters specified in the object declarations to the manager 312. For each object, the virtual object manager 312 obtains at least a respective first set of third-party content to initially display on the object, such as a set of third-party images to display on outer surfaces of the object. In some implementations, the virtual object manager 312 obtains third-party content to present on an object using network interface 314 to request third-party content from content distribution system 350. The virtual object manager 312 then returns to the rendering engine 308 for presentation in the 3D environment a 3D model that represents the geometry of the 3PCE virtual object and the third-party content that has been selected for display on the object. In some implementations, the third-party content is text. In some implementations, the third-party content is one or more images, videos, or both. The rendering engine 308 then draws the virtual 3D object in the 3D environment for presentation to a user.

In some implementations, the virtual object manager 312 is further configured to handle responses to detected user interactions with 3PCE virtual objects in a 3D virtual environment. For instance, upon detecting that a user's actions in the virtual environment match a predefined set of user actions that indicate a user has interacted, or likely is about to interact, with a 3PCE virtual object, the input handler 310 may call on the virtual object manager 312 to determine how to respond to the user interaction, or the anticipated user interaction, with the object. In the call to the virtual object manager 312, the input handler 310 may pass an identifier for the object that is the target of the interaction or anticipated interaction, and may further pass information that characterize the type of interaction with the object (e.g., gaze and select, extended gaze, hand-based object manipulation). The virtual object manager 312 may use the information passed from the input handler 310 to determine how to respond to a given user interaction with an object or how to respond to an anticipated user interaction with the object. In some implementations, the virtual object manager 312 maintains a log of user interactions or anticipated user interactions with 3PCE objects that have been detected in a virtual environment, which is automatically and periodically reported to the content distribution system 350 or another system that analyzes patterns of user interactions with 3PCE objects in 3D virtual environments. Therefore, when the virtual object manager 312 receives an indication from the input handler 310 of a user interaction or anticipated user interaction with a 3PCE virtual object, the virtual object manager 312 can add an entry to the log that captures salient information about the interaction, such as a timestamp for the interaction, the targeted object of the interaction, and context associated with the interaction.

A 3PCE virtual object can be activated in one of multiple modes associated with the object. In some implementations, 3PCE objects have a primary mode and a secondary mode. In the primary mode, the object displays a primary set of third-party content. In the secondary mode, the object provides information to a user of the client computing system 302 using a particular transition-state model selected from a set of possible transition-state models. As discussed in further detail below with respect to FIG. 4B, each transition-state model represents a respective technique by which the object presents, in the secondary mode, additional information related to the primary set of third-party content.

For example, using a first transition-state model, the 3PCE virtual object is configured to present a secondary set of third-party content. The secondary set of third-party content may be different from the primary set of third-party content, but still related to a same topic or entity associated with the primary set of third-party content. The secondary set of third-party content may also have a different type (e.g., media format) from the first set of third-party content. For example, in the first mode, a 3PCE virtual object may show a collection of images related to a particular product or service as the primary set of third-party content. In the second mode, the primary content may be replaced with a video about the particular product or service as the secondary set of third-party content. The video may be a 2D video, or in some implementations, may be an immersive 360-degree video.

Alternatively, using a second transition-state model, the 3PCE virtual object is configured to generate an external notification about a topic or entity associated with the primary set of third-party content. An external notification is a notification which is provided to the user outside of the 3D environment (e.g., in a different application and/or on a different device), such as a notification in a short-message service (SMS) text message, a social media message, an email message, or a notification displayed in a notifications list of a smartphone or other mobile device or computing system.

Alternatively, using a third transition-state model, the 3PCE virtual object is configured to provide a portal to an external destination associated with a topic or entity related to the primary set of third-party content. For example, the object may present a pop-up frame showing a specified website associated with the topic or entity related to the primary set of third-party content, a pop-up frame showing an application associated with the topic or entity related to the primary set of third-party content, or may direct the user to different 3D environment associated with the topic or entity related to the primary set of third-party content. In some implementations, the secondary mode of a 3PCE virtual object may provide aspects of two or more transition-state models, such as a virtual object that both presents a secondary set of third-party content and sends an external notification to a user.

The transition-state model(s) assigned to a given 3PCE object may be selected by the virtual object manager 312 of the client computing system 302, a transition-state model selector 368 of the content distribution system 350, or both. In some implementations, in response to receiving an indication from the input handler 310 of a user interaction with a 3PCE virtual object while the object displays a primary set of third-party content in the first mode, the virtual object manager 312 identifies a transition-state model assigned to the object and parameters associated with the transition-state model (e.g., a set of secondary third-party content, a notification message, a pointer to an external environment). The virtual object manager 312 then instructs the rendering engine 308 to transition the 3PCE object from the first mode to the second mode using the identified transition-state model and the identified parameters of the transition-state model. In response, the rendering engine 308 re-renders the object in the second mode using the identified transition-state model and in accordance with the specified parameters associated with the transition-state model. For example, using the first transition-state model and in response to user interaction with a 3PCE object in a 3D environment, the rendering engine 308 may animate the virtual object to morph or otherwise transition from the first mode to the second mode. The primary third-party content (e.g., images) displayed on surfaces of a 3D geometric model may be removed and replaced with secondary third-party content (e.g., a video).

The client computing system 302 transmits messages to, and receives messages from, the content distribution system 350. The content distribution system 350 may be implemented as one or more computers (e.g., data processing apparatus) in one or more locations. In general, the content distribution system 350 is configured to select third-party content to display with 3PCE virtual objects in a 3D environment at the client computing system 302. The content distribution system 350 makes selected third-party content available to the client computing system 302, e.g., by transmitting the content to the client system 302 over a network such as the Internet or a local area network. The content distribution system 350 can include one or more of a front-end server 352, a third-party content database 354, a content selector 366, a transition-state model selector 368, a first data repository 370 that stores selection criteria, a second data repository 372 that stores end-user account and profile information, and a third data repository 374 that stores third-party content provider account and profile information.

The front-end server 352 is configured to receive and transmit information from the content distribution system 350. The front-end server 352 provides an interface for the content distribution system 350 to interact with other computers over a communications network (e.g., the Internet). For example, FIG. 3 shows the front-end server 352 in communication with the client computing system 352. The front-end server 304 receives requests for third-party content, performs initial processing of received requests, forwards information derived from requests to other appropriate components of the content distribution system 350, and transmits responses that the system 350 generates in response to requests. In some implementations, the front-end server 350 includes a network interface that provides an interconnection between the content distribution system 350 and one or more networks, which may be either public (e.g., the Internet) or private (e.g., a local area network). The network interface may include one or more network interface cards, which for example, are configured to transmit and receive data over a packetized network.

The content database 354 is a database, or other type of data repository, that maintains an index of third-party content. The third-party content itself may also be stored by the content database 354, may be stored by the content distribution system 350 but externally of the content database 354, or may be stored at one or more other systems outside of the content distribution system 350. In general, the content database 354 identifies the set of third-party content that is available for the content distribution system 350 to return to client systems in response to requests for third-party content, e.g., for presentation on 3PCE virtual objects. In some implementations, the third-party content is independently created by third-party content providers (e.g., advertisers) and is then submitted to the content distribution system 350 for targeted distribution to end users. In some implementations, content providers may create the third-party content using a content creation platform or service of the content distribution system 350. Third-party content may be provided as text, images, videos, or in other media formats.

In some implementations, the content database 354 includes indices 356, 358 for primary third-party content and secondary third-party content, respectively. Primary third-party content is content that is designated for presentation on a virtual object when the object is in a first mode. Secondary third-party content is content that is designated for presentation on a virtual object when the object is in a second mode. In some implementations, the first mode of a 3PCE virtual object is a "low-power" mode in which the object is presented in a 3D environment with a relatively low computational expense for the client computing system 302. The low-power mode can be achieved at least in part by displaying only primary third-party content on the object, which complies with one or more specified constraints for primary third-party content. The constraints may define acceptable formats and sizes for primary third-party content, for example. For instance, images having a specified resolution may be deemed acceptable primary third-party content, but videos may be deemed unacceptable as primary third-party content. Rather, videos may be permitted only as secondary third-party content, for example. Therefore, less bandwidth may be expended transmitting primary third-party content to the client computing system 302 than secondary third-party content. Additionally, presenting primary third-party content in the 3D environment may be less computationally intensive for the client computing system 302 than presenting secondary third-party content.

The primary and secondary third-party content indices 356, 358 may group individual content items into sets of related content items. For example, in the first display mode, a 3PCE virtual object may have a cubic geometry and displays a respective primary third-party content item on each of the six faces of the cube. The content distribution system 350 may select related or duplicate content items to display on all or some of the cube's faces. For example, a set of related images submitted by a particular third-party content provider may be returned to the client computing system 302 for display on the cube, or a set of related images that have been algorithmically determined to relate to a common topic or entity may be selected and returned using the primary third-party content index 356 for display on the cube. In some implementations, the content database 354 may map primary third-party content to secondary third-party content. If a particular set of primary third-party content is selected for display on a 3PCE virtual object in the first display mode, the content selector 366 may select only secondary third-party content for the same virtual object in the second display mode that is mapped to the particular set of primary third-party content that was selected for the object. For example, the primary set of third-party content may include a set of images related to a product or service offered by a third-party content provider and the mapped secondary third-party content items may be one or more videos about the same product or service. The content selector 366 may select one or more of the mapped secondary third-party content items to return for display with the virtual object in the second display mode, thereby maintaining a topical relationship between the primary and secondary third-party content presented by a given virtual object.

In some implementations, the content database 354 stores data in addition to the respective third-party content indices 356 and 358. For example, the content database 354 may store data structures representing third-party content attributes 360, external notifications 362, portal parameters 364, or multiple of these.

The third-party content attributes data store 360 stores data indicating attributes of third-party content items represented in indices 356, 358. By way of example, the attributes for a given third-party content item can include descriptive keywords for the third-party content item, a unique identifier for the third-party content provider that submitted the content item, a format or type of the content item (e.g., text, audio, image, video), and historical performance metrics of the content item (e.g., impressions, click-through rates, conversion rates). Attributes can be assigned to individual content items or to groups of content items. The attributes may be automatically determined by the content distribution system 350, or manually entered (e.g., by an agent of the content distribution system 350 or an agent of a corresponding third-party content provider). In some implementations, the content selector 366 uses attributes from data store 360 to select third-party content item(s) responsive to third-party content requests. For instance, a request transmitted from the client computing system 302 for third-party content can include context data that indicates information about the end user of the client system 302, the 3D environment in which the third-party content is to be rendered on a virtual object, an application in which the 3D environment is executed, and/or the hardware configuration of client system 302. The content selector 366 can compare the context of a third-party request to the third-party content attributes indicated by data store 360 as part of a procedure for selecting "winning" third-party content, i.e., third-party content that is returned responsive to the request.

The external notifications data store 362 stores data that represents external notifications associated with third-party content items. The content distribution system 350 may return an external notification to the client system 302, and/or to one or more accounts associated with a user of the client system 302, if the client system 302 has adopted a transition-state model that leverages external notifications to provide additional information to a user about topics or entities shown in primary third-party content items displayed on a virtual object. The data store 362 may include data defining one or more notification messages and data that maps the notification messages to corresponding third-party content items, groups of third-party content items, or third-party content providers. Upon receiving an indication of a user interaction with a 3PCE virtual object in the first display mode, the content distribution system 350 selects a notification message from data store 362 to provide to the user. The selected notification message may be mapped to the primary set of third-party content displayed on the virtual object, or the primary set of third-party content and the selected notification message may be at least indirectly related based on their mutual connection to the same third-party content provider. For example, based on an indication that a user has interacted with a 3PCE cube in the first display mode in which the cube shows third-party images representing a product or service, a notifications controller of the content distribution system 350 may transmit a notifications message for presentation to the user via one or more channels (e.g., email, SMS, application-level notifications service, operating system-level notifications service).

In some implementations, the data store 362 includes data defining templates for notification messages. The templates may include fields in a text message that can be populated with information specific to an end user or otherwise based on the context of a particular user interaction with a 3PCE virtual object. For example, a notifications template that states "$name: Don't miss this exciting opportunity! Visit our website at www.example.com!" includes the $name field that can be populated (e.g., replaced) with the first name of the end user of the client computing system 302 whose interaction with the object triggered the notification. In some implementations, notifications can include hyperlinks that specify a target URL, e.g., of a web page, or a target URI, e.g., of a specific application installed on the user's phone or other device. The notifications controller may generate a target URL that includes a signature uniquely identifying a particular user interaction with a 3PCE virtual object that resulted in generation of the external notification message in which the hyperlink with the target URL is placed. When a user selects the target URL, a request that includes the unique signature can be sent to the content distribution system 350. The content distribution system 350 can log that that the user has selected the URL and then returns instructions (e.g., a script) to the user device (e.g., client system 302) that redirects the device to a destination resource, such as a website operated by the corresponding third-party content provider.

The portal parameters data store 364 includes data that identifies portal resources associated with primary third-party content or third-party content providers. The distribution system 350 accesses data store 364 to select and return a portal resource, or a pointer to a portal resource, to the client computing system 302 in response to a request for a portal resource from the client system 302. The client system 302 may request a portal resource, for example, in response to detecting a user interaction with a 3PCE virtual object in the first display mode. A portal resource is generally a resource that is separate from a 3D environment of an object that provides a portal to the resource and that is rendered either in a window within the 3D environment or that is rendered separately from the 3D environment. For example, a portal resource may be a website that is automatically launched in a web browser when a user interacts with a 3PCE virtual object in a 3D environment. The website may be presented in a web browser window in the 3D environment or may be launched separately outside of the 3D environment. In some implementations, the portal resource is a third-party application installed on the client system 302. When the user interacts with a 3PCE virtual object in the 3D environment, the application may launch within a window of the 3D environment or the user may be automatically taken out of the 3D environment and to the application. In some implementations, the portal resource is another 3D environment. For example, when the user interacts with a 3PCE virtual object in a first 3D environment, the client system 302 may automatically leave the first 3D environment and render a second 3D environment related to a topic or entity identified by the primary content that was shown on the object when the user interaction with the object occurred. The data store 364 stores parameters related to portal resources and data that links (e.g., maps) portal resources to third-party content referenced in indices 356 and 358. A portal controller of the content distribution system 352 may access the data store 364 to determine eligible portal resources from which to select a particular resource to direct the client system 302 toward based, for example, on being mapped to third-party content shown on a virtual object with which a user interacted.

Content selector 366 is the component of the content distribution system 350 that selects winning third-party content for a request, e.g., primary or secondary third-party content to display with a 3PCE virtual object. To determine winning third-party content, the content selector 366 evaluates eligible third-party content items with respect to various selection criteria associated with a request. The selection criteria may include keywords or other context data specified in a request. In some implementations, the selection criteria include profile data that indicates interests and preferences of the end user of the client system 302, profile data of third-party content providers, and information about the 3D environment in which the virtual object is presented. The selection criteria 324 can further include bids set forth by third-party content providers that indicate a price the third-party content provider is willing to pay for the provider's third-party content to be selected and returned for display on or by a 3PCE virtual object in response to a request. The content selector 366 applies the selection criteria 324 to a given third-party content request and performs the evaluation process to select winning third-party content.

The content distribution system 350 can also include a transition-state model selector 368. The transition-state model selector 368 is configured to assign transition state models to 3PCE virtual objects in a 3D environment. A transition state model represents the type of operations that are performed when a 3PCE virtual object changes from a first display mode to a second display mode. The second display mode of a virtual object is generally inactive (e.g., hidden) until a user interaction occurs with the object, which then triggers performance of operations defined by a transition state model assigned to the object. For example, a first transition state model may provide that secondary third-party content is to be displayed on a virtual object in response to a user interaction with the object. A second transition state model may provide for external notifications to be sent to a user outside of the 3D environment in response to a user interaction with an object. A third transition state model may provide for a portal resource to be launched in response to a user interaction with an object. The transition-state model selector 368 determines which transition-state model, or transition-state models, to apply to a 3PCE virtual object. In some implementations, the transition-state model selector 368 randomly selects a transition-state model to assign to an object. In some implementations, the transition-state model selector 368 selects a transition-state model to assign to an object based on context associated with the object. An appropriate transition-state model can be selected based on capabilities of the client system 302, end-user preferences, third-party content provider preferences, preferences of the developer of the 3D environment in which the object is placed, or multiple ones of these contexts.

In some implementations, the transition-state model selector 368 applies a set of rules to select a transition-state model to assign to an object. For example, the transition-state model selector 368 may first check whether a plugin that is required to launch a portal resource has been installed at the client system 302 (e.g., by polling the client system to obtain information about installed plugins, looking up an index that includes a mapping of the client system to installed plugins, or obtaining information about installed plugins from a request for content). If the plugin has been installed, then the transition-state model selector 368 may assign the transition-state model that uses the portal resource to the object. If the plugin is not installed, then another transition state model may be selected. In some implementations, third-party content or developers may specify which transition-state model should apply to a given object or should be associated with a primary set of third-party content.

Figure 4A:
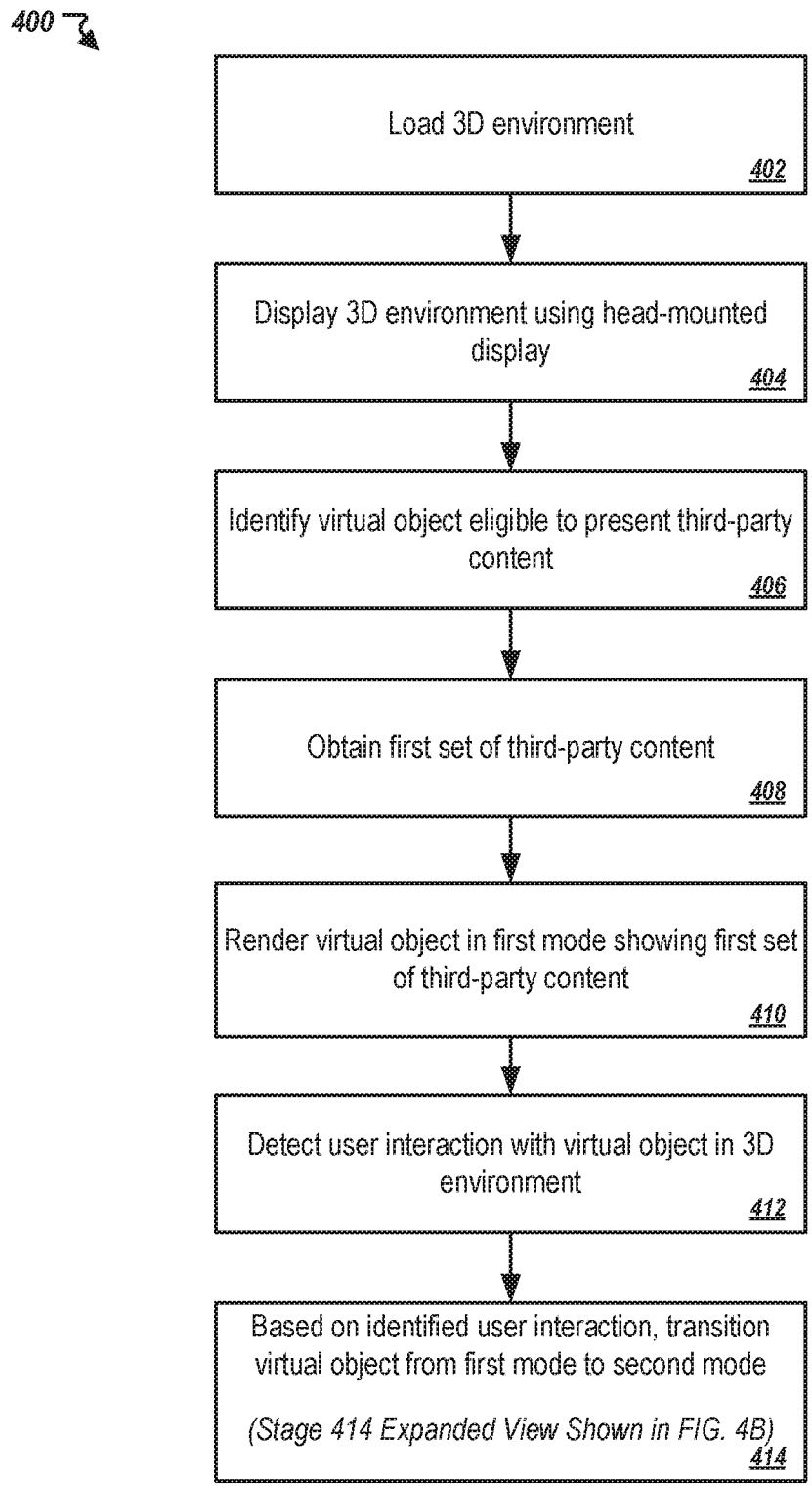
FIGS. 4A and 4B depict a flowchart of an example process for rendering a virtual object in a 3D environment.
Figure 4B:
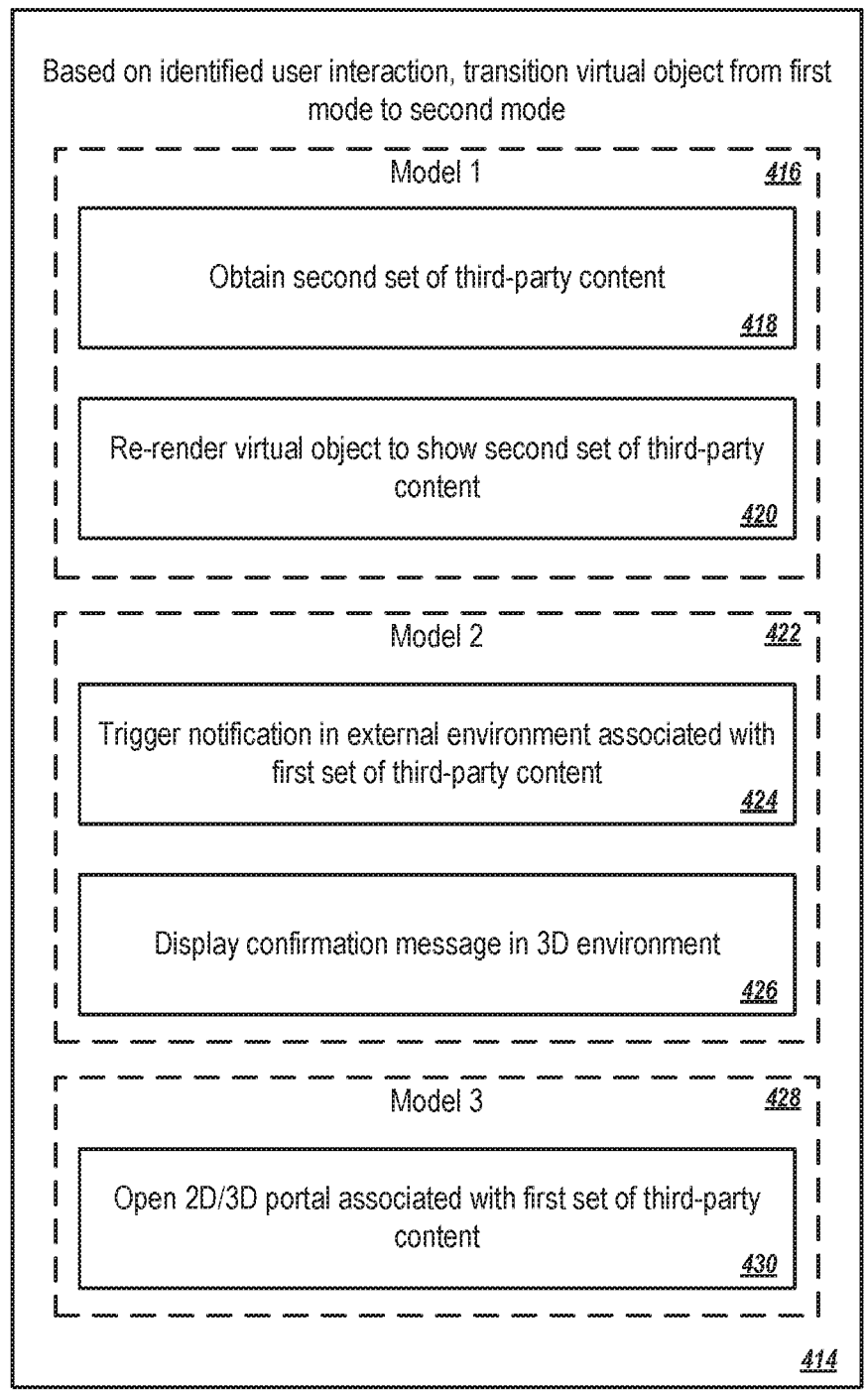

FIGS. 4A and 4B depict a flowchart of an example process 400 for rendering a virtual object in a 3D environment. The client process 400 may be performed by a client computing system such as client system 302 (FIG. 3). In some implementations the client computing system is a virtual reality system that renders an immersive 3D environment, which is presented through a head-mounted display.

At stage 402, the client system loads a 3D environment. A 3D environment is a virtual environment that is capable of being rendered in three dimensions. Examples of 3D environments include 3D gaming and video environments (e.g., live or recorded event streams such as 3D concert or athletic event streams). In some cases, a user can explore a virtual 3D environment by moving his or her head to look around the environment (e.g., in a virtual reality system), by moving around the environment, by manipulating objects in the environment, or a combination of these. The 3D environment may be defined in one or more definition files stored in a memory subsystem of the client. In some implementations, the definition files are interpreted or executed by a rendering engine to generate a visual display of the 3D environment (stage 404), which may be presented on a suitable display for the particular type of client system. For example, a head-mounted display may be employed in a virtual reality system.

At stage 406, the client system identifies a third-party content eligible (3PCE) virtual object located in the 3D environment. A 3PCE virtual object may be declared by providing, for example, a tag, a script, or executable code in a definition file for a 3D environment. When the client system interprets or otherwise executes the tag, script, or executable code, the rendering engine may instantiate a 3PCE virtual object in the 3D environment in accordance with any parameters specified therein. For example, a developer may specify parameter values indicating the shape, size, and location of the virtual object in the 3D environment. These and other attributes may be used by a content selector at the content distribution system, a transition-state model selector at the client system or the content distribution system, or both, to select third-party content to present with the object or to select a transition state model for the object, respectively.

A 3PCE object may be associated with multiple display modes, where each display mode corresponds to a respective transition state model that defines a manner in which the object displays third-party content or otherwise defines operations associated with the object when the display mode is activated. In some implementations, 3PCE objects are initially activated in a default display mode. For example, in the default display mode, a 3PCE virtual object may show a primary set of third-party content that is relatively basic (e.g., images), which can be rendered with relatively low computational expense in the 3D environment. The object may transition to one or more other display modes upon the detection of predefined events such as sustained user interaction with the object.

At stage 408, the client system obtains a primary set of third-party content to display on the virtual object in the first display mode. To retrieve the primary set of third-party content, the client system generates and transmits a request to a content distribution system. The request can include any explicit constraints for the selection of the third-party content and context data that the content selector at the content distribution system may use to facilitate selection of the primary set of third-party content. In some implementations, the primary set of third-party content is a group of content items that were each made available for distribution by the same third-party content provider. As an example, the virtual object may be a cube that presents a respective image on each of its faces in the first display mode. The primary set of third-party content may include a respective image that is assigned for display on each face of the cube, where each image relates to a common topic (e.g., a product or service promoted by the third-party content provider).

At stage 410, the rendering engine generates a display of the virtual object in the 3D environment. The system may initially render the object in its first display mode that presents the primary set of third-party content retrieved from the content distribution system.

At stage 412, the client system detects that a user has provided input to the system to interact with the virtual object in the first display mode. The client system can include an input handler that monitors one or more modes of user inputs, and if the user inputs are determined to be directed to a 3PCE virtual object, the system may throw an alert to a virtual object manager. For example, in a VR system, the input handler may detect if the reticle of a user's display maintains focus on an object for at least a threshold length of time. If the reticle is focused on the object for at least the threshold length of time (indicating that the user's gaze is maintained in the direction of the object for at least the threshold length of time), then the input handler may pass a message to the virtual object manager indicating that a user interaction with a virtual object has been detected.

At stage 414, in response to receiving a message from the input handler indicating that a user has interacted with a virtual object in the 3D environment, the virtual object manager determines a transition for the virtual object from the first display mode to a second display mode. FIG. 4B depicts an expanded view of stage 414 showing several possible transitions for the virtual object. A transition state selector at the client system or the content distribution system may determine which transition model applies for a given virtual object based, for example, on any explicit constraints specified by the end user, 3D environment developer, and/or third-party content provider that submitted the primary set of third-party content. In addition, or alternatively, the transition state selector may determine which transition model applies for a given virtual object randomly or based on implicit context associated with the object, the 3D environment, and technical capabilities of the client system. For example, under a first model (416), the virtual object may transition from the first display mode by replacing the primary set of third-party content with a different, secondary set of third-party content. At stage 418, the client system obtains the secondary set of third-party content from content distribution system. At stage 420, the rendering engine of the client system re-renders the virtual object to show the secondary set of third-party content. In some implementations, the type or format of the secondary set of third-party content may differ from the type or format of the primary set of third-party content. In some implementations, the 3D model that defines the geometry of the virtual object may change along with the set of third-party content presented by the object. For example, a more complex virtual object having more polygonal surfaces may be rendered in the second display mode than in the first display mode. The client system may request and receive the new 3D model from the content distribution system. In some implementations, the transition between the first and second display modes of the virtual object includes animating the virtual object to smoothly change the visual appearance of the object.

Under a second transition model (422), user interactions with a virtual object triggers the client system, the content distribution system, or both, to generate one or more external notifications. An external notification is a notification provided to a user of the client system outside of a 3D environment that includes a virtual object with which a user interacted to trigger the notification. Because users tend to prefer minimal distractions in a 3D environment—particularly in immersive 3D virtual reality environments—external notifications can be an effective way to remind users of third-party content that they encountered in a 3D environment after the user completes his or her session in the 3D environment. For example, a notification message may be pushed to a user's email account, text messaging account, RSS feed, OS-level notifications service, application-level notifications service, or multiple of these. In particular, the user's interaction with a virtual object triggers generation and transmission of a notification to one or more external environments at stage 424. In some implementations, at stage 426, a confirmation message can be displayed on or in the vicinity of the virtual object to confirm that the notification message is being, or has been, sent to a user's account(s).

Under a third transition model (428), a user's interaction with a virtual object triggers the client system to portal to an external resource (stage 430). The external resource for an object may be specified at the content distribution system, which may identify the resource for the client system when the virtual object is first instantiated or at another time, e.g., in response to detecting a user's interaction with the object. By way of examples, the client system may portal to an external resource by automatically launching an application (e.g., a web browser) in which the external resource is presented. In some implementations, the 3D environment is closed and attention redirected to the external resource (e.g., a website displayed in a web browser). The external resource may be related to the primary set of third-party content that the virtual object displays in the first display mode. In some implementations, the client system portals to an external resource by launching a different 3D environment that, e.g., has been submitted for distribution by the same third-party content provider that submitted the primary set of third-party content shown on the virtual object.

Figure 5:
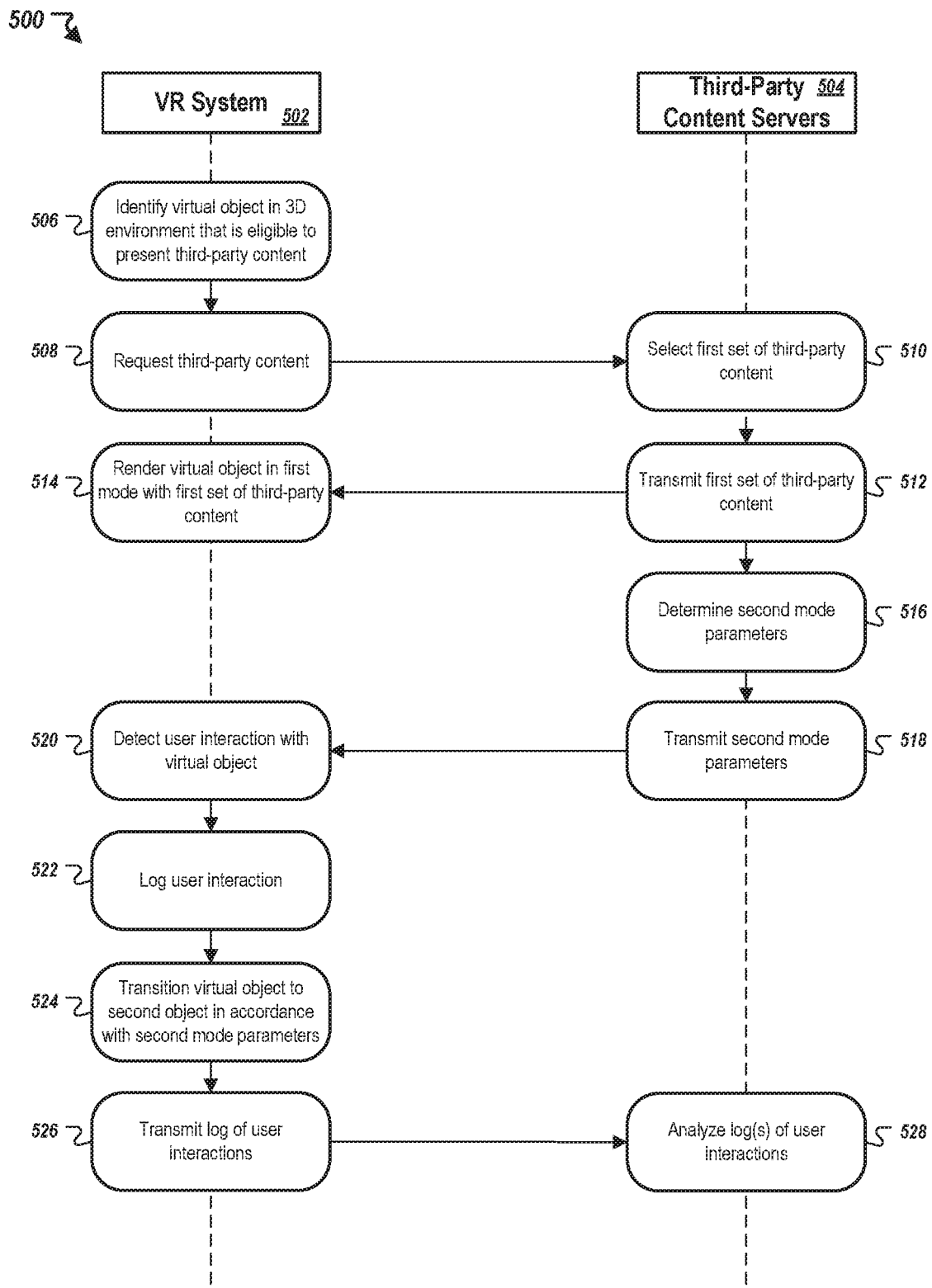
FIG. 5 depicts a swim-lane diagram showing interactions in an example process between a client VR system and a content distribution system.

FIG. 5 depicts a swim-lane diagram showing interactions in an example process 500 between a client VR system 502 and a content distribution system 504.

At stage 506, the VR system 502 identifies that a 3PCE virtual object is declared to present in a 3D environment. The object may be declared, for instance, by a tag, script, or executable code in one or more definitional files for the 3D environment.

At stage 508, the VR system 502 generates and transmits to the content distribution system 504 a request for third-party content. The identified virtual object may be associated with multiple display modes in which different third-party content is displayed, for example. In some implementations the VR system 502 initially retrieves only a primary set of third-party content that is displayed in the initially activated display mode of the third-party object. Retrieval of other sets of third-party content that may be displayed when other display modes are activated may be deferred until a user interacts with the virtual object, or until the system 502 detects that the user likely is about to interact with the virtual object. As such, the virtual object may initially load faster and any secondary third-party content may not be retrieved until it is actually needed (or is likely needed), thereby avoiding needless transmissions of third-party content from the content distribution system 504 to the VR system 502.

At stage 510, the content distribution system 504 receives the request for third-party content and selects the primary set of third-party content for the virtual object in the initial display mode. At stage 512, the content distribution system 504 transmits the third-party content over the network to VR system 502. At stage 514, the VR system receives the selected primary content and renders the virtual object textured with the primary third-party content.

At stage 516, the content distribution system 504 determines parameters for a second display mode of the virtual object. The second mode parameters indicate how the virtual object will transition from the first display mode to the second display mode and the result of transitioning to the second display mode. In some implementations, the second mode parameters specify one or more transition models that should apply to the virtual object. For example, a transition model selector of the content distribution system may assign a selected transition model to the virtual object, which indicates whether secondary third-party content will replace the primary third-party content on the virtual object when the object transitions from the first display mode to the second mode; whether external notifications will be generated when the object transitions from the first display mode to the second display mode; and whether the virtual object is to provide a portal from the initial 3D environment to an external resource when the object transitions from the first display mode to the second display mode.

At stage 518, the content distribution system 518 transmits the second mode parameters to the third-party content servers 504. In some implementations, the VR system 502 includes local logic for carrying each of the possible transition models. The second mode parameters transmitted to the VR system 502 may then simply include an indication of the selected transition model. In other implementations, the VR system 502 may transmit a script or other executable code to the VR system 502 with an instruction to execute the code in response to detecting a user interaction with the virtual object. In some implementations, as shown in FIG. 5, the content distribution system 500 carries out stages 516 and 518 before the user has interacted with the virtual object. Therefore, the VR system is ready to immediately transition the object according to the second mode parameters upon detecting a user interaction with the object. In this manner, the system may reduce latency in responding to a user's interaction with the object and transitioning the object to the second display mode. In other implementations, however, the VR system 502 may request the second mode parameters from the content distribution system 504 after a user interaction is actually detected with a virtual object or after the VR system 502 detects that a user interaction with the object is about to occur.

At stage 520, the VR system 520 detects a user interaction with a virtual object, and an entry for the user interaction is recorded in a log at the VR system 520 (stage 522). At stage 524, based on identifying the user's interaction with the virtual object, the VR system 502 transitions the virtual object from the first display mode to the second display mode in accordance with the second mode parameters. The VR system 502 can periodically report user interactions to the content distribution system for analysis. Thus, at stage 526, the log of user interactions is sent to the content distribution system 504, which can be analyzed for trends and to assess performance metrics of third-party content items (stage 528).

In some implementations, a content distribution system may assess the performance of third-party content associated with 3PCE virtual object by tracking conversions of external notifications generated in response to user interactions with virtual objects in 3D environments. A "conversion" refers to particular actions that a user may take with respect to a notification that stems from interaction with a 3PCE virtual object in a 3D environment. For example, a conversion may be registered if the user views the notification, if the user selects a hyperlink provided in a notification, or if the user completes a transaction (e.g., a purchasing transaction) related to a product or service described in the notification.

Figure 6:
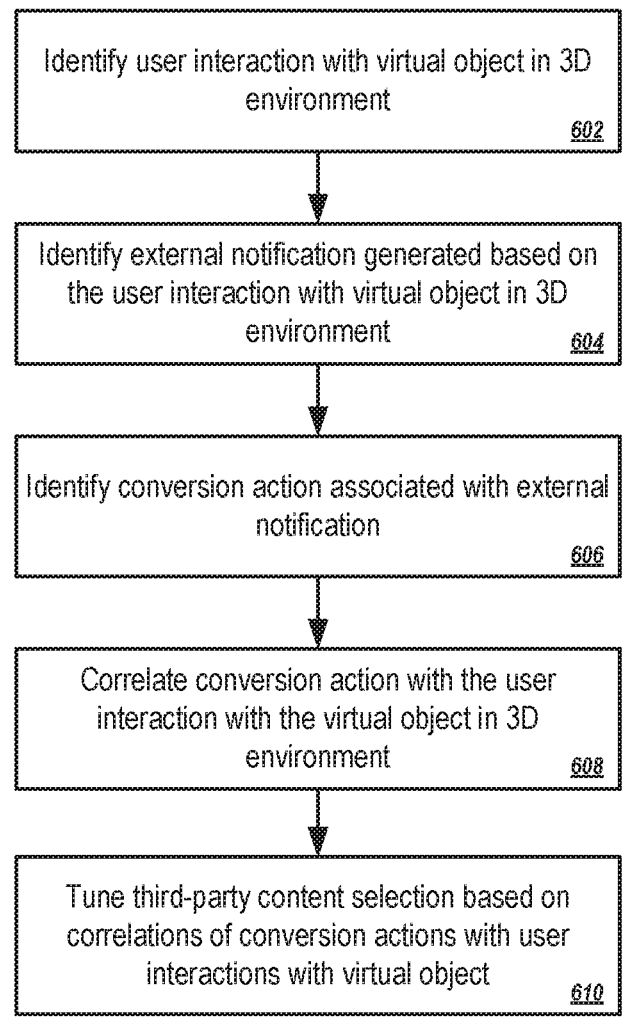
FIG. 6 depicts a flowchart of an example process for assessing third-party content selections in a 3D environment based on conversions associated with external notifications that were generated as a result of user interactions with 3PCE virtual objects.

To this end, FIG. 6 depicts a flowchart of an example process 600 for assessing third-party content selections in a 3D environment based on conversions associated with external notifications that were generated as a result of user interactions with 3PCE virtual objects. In some implementations, the process 600 is performed by a content distribution system such as content distribution system 350 (FIG. 3).

At stage 602, the system identifies that a user has interacted with a 3PCE virtual object in a 3D environment. The system determines a transition-state model that applies to the virtual object. If specified by the transition-state model, the system can generate an external notification to provide additional information about a primary set of third-party content displayed on the object in the 3D environment (stage 604). In some implementations, the system records an entry to a log (e.g., in a database subsystem) that identifies the generated external notification, the user interaction that resulted in generation of the external notification, and context data associated with the user interaction. Later, the system may receive an indication of a conversion action associated with the notification (stage 606). For example, the user's selection of a hyperlink in a notification message may cause a client system to transmit a message to the content distribution system that indicates the user's selection of the hyperlink. Upon receiving the indication of the conversion action, the system correlates the conversion action with the corresponding notification message and with the user interaction event that triggered the notification message (stage 608). In some implementations, based on the indicated conversion action, the system adjusts a score assigned to third-party content that was displayed on the virtual object at the time the user interaction occurred with the object in the 3D environment. The score may be used by a content selector in determining content to return in future third-party content requests. In some implementations, the score is adjusted to increase the likelihood that the content distribution system selects the third-party content to which the score is assigned as a result of the conversion action (stage 610).

Figure 7:
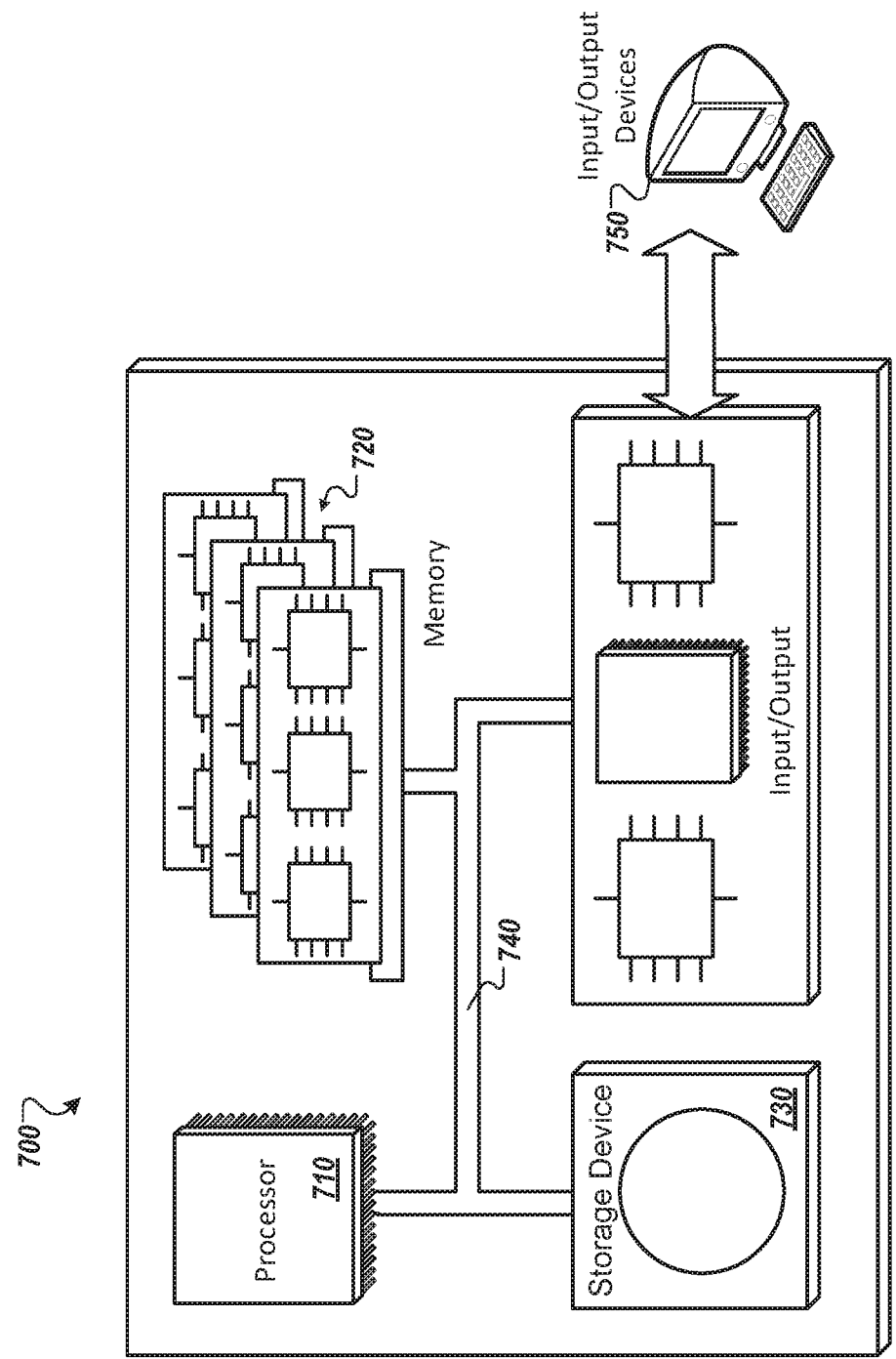
FIG. 7 is a schematic diagram of a computer system, which can be used to carry out the operations described in association with the computer-implemented methods, systems, devices, and other techniques described herein.

FIG. 7 is a schematic diagram of a computer system 700. The system 700 can be used to carry out the operations described in association with any of the computer-implemented methods, systems, devices, and other techniques described previously, according to some implementations. The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In some implementations, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 400. In one implementation, the storage device 730 is a computer-readable medium. In various different implementations, the storage device 730 may be a floppy disk device, a hard disk device, an optical disk device, or a tape device.

The input/output device 740 provides input/output operations for the system 400. In one implementation, the input/ output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computing system, comprising:
a memory subsystem configured to store first data that (i) defines a three-dimensional (3D) environment and (ii) identifies a virtual object in the 3D environment;
a communications interface configured to transmit requests over a network for third-party content to display with the virtual object in the 3D environment and to receive third-party content responsive to the requests;
a rendering engine, including one or more processors, configured to use the first data from the memory subsystem to render the 3D environment on a display device that is coupled to the computing system, including rendering, at a specified location of the 3D environment, the virtual object in a first display mode in which the virtual object displays a first set of third-party content;
an input handling apparatus, including one or more processors, configured to detect user interactions with the virtual object while rendered in the first display mode in the 3D environment; and
a virtual object manager, including one or more processors, configured to receive an indication from the input handling apparatus of a first user interaction in the 3D environment with the virtual object while rendered in the first display mode, and in response to detecting the interaction, to instruct the rendering engine to transition in the 3D environment, the rendering of the virtual object from the first display mode in which the virtual object displays the first set of third-party content to a second display mode in which the virtual object displays a second set of third-party content,
wherein the second set of third-party content that is displayed in the 3D environment on a rendering of the virtual object in the second display mode is dynamically selected by a third party responsive to a request for third-party content, and the third party that selected the second set of third-party content is different than a user of the computing system that provided the first user interaction;
wherein a type of the second set of third-party content that is displayed in the 3D environment on the rendering of the virtual object in the second display mode in response to the interaction with the virtual object presented in the first display mode is different from a type of the first set of third-party content that is displayed on the rendering of the virtual object in the first display mode, and a computational demand for displaying in the 3D environment the type of the second set of third-party content on the rendering of the virtual object in the second display mode is greater than a computational demand for displaying in the 3D environment the type of the first set of third-party content on the rendering of the virtual object in the first display mode.

2. The computing system of claim 1, wherein:
the display is a head-mounted display; and
the 3D environment is a virtual reality (VR) environment that is configured to be viewed using the head-mounted display.

3. The computing system of claim 1, wherein:
the rendering engine is configured to render the virtual object in the first display mode before the system has obtained the second set of third-party content; and
the communications interface is configured to transmit a request for the second set of third-party content based on identifying that a user interaction in the 3D environment with the virtual object in the first mode is about to occur.

4. The computing system of claim 1, wherein:
the first set of third-party content comprises a collection of images;
in the first display mode, the virtual object comprises a collection of polygonal surfaces that form a 3D geometric shape; and
the rendering engine is configured to render the virtual object in the first display mode by displaying, on each polygonal surface of the collection of polygonal surfaces, a respective image from the collection of images.

5. The computing system of claim 4, wherein the collection of polygonal surfaces of the virtual object form a cube when the virtual object is rendered in the first display mode.

6. The computing system of claim 4, wherein the rendering engine is configured, in response to receiving an instruction from the virtual object manager to transition the rendering of the virtual object from the first display mode to the second display mode, to animate the cube to reveal the second set of third-party content.

7. The computing system of claim 4, wherein the collection of images each depicts content related to a same topic or entity.

8. The computing system of claim 1, wherein:
the input handling apparatus is configured to receive user input to move a user's current viewing location within the 3D environment and to detect a relationship between the user's current viewing location and the location of the rendering in the 3D environment of the virtual object in the first display mode; and
the virtual object manager is configured to transition the rendering in the 3D environment of the virtual object from the first display mode to the second display mode based on a determination that the relationship between the user's current viewing location within the 3D environment and the location of the rendering in the 3D environment of the virtual object satisfies one or more criteria.

9. The computing system of claim 8, wherein the relationship between the user's current viewing location within the 3D environment and the location of the rendering in the 3D environment of the virtual object is a distance between the user's current viewing location within the 3D environment and the location of the rendering in the 3D environment of the virtual object, wherein the virtual object manager is configured to transition the rendering in the 3D environment of the virtual object from the first display mode to the second display mode based on a determination that the distance between the user's current viewing location and the location of the rendering of the virtual object is less than a threshold distance within the 3D environment.

10. The computing system of claim 1, wherein the input handling apparatus is configured to monitor a direction of a user's gaze in the 3D environment and to detect the first user interaction in the 3D environment based on identifying that the user's gaze is in the direction of the rendering of the virtual object.

11. The computing system of claim 10, wherein the virtual object manager is configured to transition the rendering of the virtual object from the first display mode to the second display mode based on identifying that the user's gaze in the 3D environment has been maintained in the direction of the virtual object for a predetermined length of time.

12. The computing system of claim 1, wherein the input handling apparatus is configured to receive inputs from a hand-based controller and to detect the first user interaction in the 3D environment based on a first input received from the hand-based controller while a user's gaze is in the direction of the rendering of the virtual object in the 3D environment.

13. The computing system of claim 1, wherein the virtual object manager is further configured, in response to receiving the indication from the input handling apparatus of the first user interaction in the 3D environment with the rendering of the virtual object in the first display mode, to trigger generation of a user notification outside of the 3D environment, the user notification being related to a topic or entity associated with the first set of third-party content that was displayed in the 3D environment on the rendering of the virtual object in the first display mode.

14. The computing system of claim 1, wherein the type of the first set of third-party content that the virtual object displays in the first display mode is images, wherein the type of the second set of third-party content that the virtual object displays in the second display mode is videos or 3D models.

15. A computer-implemented method, comprising:
displaying, on a display of a computing system, a three-dimensional (3D) environment;
obtaining, by the computing system, a first set of third-party content to display in the 3D environment on a virtual object when the virtual object is rendered in a first mode in the 3D environment;
rendering, by the computing system and in the 3D environment, the virtual object in the first mode in which the virtual object presents the first set of third-party content;
identifying that a user interaction in the 3D environment with the rendering of the virtual object in the first display mode meets a predefined set of criteria; and
in response to identifying the user interaction in the 3D environment with the the virtual object while rendered in the first display mode meets the predefined set of criteria, transitioning in the 3D environment the rendering of the virtual object in the first display mode to a second display mode in which the virtual object presents a second set of third-party content that is different from the first set of third-party content,
wherein the second set of third-party content is dynamically selected by a third party responsive to a request for third-party content, and the third party that selected the second set of third-party content is different than a user of the computing system that provided the user interaction with the rendering of the virtual object while rendered in the first display mode in the 3D environment,
wherein a type of the second set of third-party content that is presented in the 3D environment on the rendering of the virtual object in the second display mode in response to the interaction with the virtual object presented in the first display mode is different from a type of the first set of third-party content that is presented on the rendering of the virtual object in the first display mode, wherein a computational demand for presenting in the 3D environment the type of the second set of third-party content on the rendering of the virtual object in the second display mode is greater than a computational demand for presenting in the 3D environment the type of the first set of third-party content on the rendering of the virtual object in the first display mode.

16. The computer-implemented method of claim 15, wherein the first set of third-party content comprises a collection of images and rendering the virtual object in the first display mode comprises rendering a cube that shows a respective image from the collection of images on each face of the cube, wherein the second set of third-party content comprises a video and transitioning the virtual object from the first display mode to the second display mode comprises playing the video in the 3D environment.

17. The computer-implemented method of claim 15, further comprising retrieving the second set of content from a server that is separate from the computing system in response to identifying the user interaction, or another user interaction, with the rendering in the 3D environment of the virtual object in the first display mode.

18. A computing system, comprising:
one or more processors; and
one or more computer-readable media having instructions stored thereon that, when executed by the one or more processors, cause the one or more processors to perform operations comprising:
providing a three-dimensional (3D) environment for display;
obtaining a first set of third-party content to display in the 3D environment on a virtual object when the virtual object is rendered in a first mode in the 3D environment;
rendering in the 3D environment the virtual object in the first mode in which the virtual object presents the first set of third-party content;
identifying that a user interaction in the 3D environment with the rendering of the virtual object in the first display mode meets a predefined set of criteria; and
in response to identifying the user interaction in the 3D environment with the virtual object while rendered in the first display mode meets the predefined set of criteria, transitioning in the 3D environment the rendering of the virtual object in the first display mode to a second display mode in which the virtual object presents a second set of third-party content that is different from the first set of third-party content,
wherein the second set of third-party content is dynamically selected by a third party responsive to a request for third-party content, and the third party that selected the second set of third-party content is different than a user of the computing system that provided the user interaction with the rendering of the virtual object while rendered in the first display mode in the 3D environment,
wherein a type of the second set of third-party content that is presented in the 3D environment on the rendering of the virtual object in the second display mode in response to the interaction with the virtual object presented in the first display mode is different from a type of the first set of third-party content that is presented on the rendering of the virtual object in the first display mode, wherein a computational demand for presenting in the 3D environment the type of the second set of third-party content on the rendering of the virtual object in the second display mode is greater than a computational demand for presenting in the 3D environment the type of the first set of third-party content on the rendering of the virtual object in the first display mode.

19. The computing system of claim 18, wherein the first set of third-party content comprises a collection of images and rendering the virtual object in the first display mode comprises rendering a cube that shows a respective image from the collection of images on each face of the cube, wherein the second set of third-party content comprises a video and transitioning the virtual object from the first display mode to the second display mode comprises playing the video in the 3D environment.

20. The computing system of claim 1, wherein:
the rendering engine is configured to render the virtual object in the first display mode before the system has obtained the second set of third-party content; and
the communications interface is configured to transmit a request for the second set of third-party content based on identifying that the first user interaction with the virtual object has occurred.

* * * * *